UNITED STATES PATENT OFFICE.

HENRY DUBBS, OF FRANKLIN, PENNSYLVANIA.

IMPROVEMENT IN COMPOUNDS FOR DECOLORIZING PETROLEUM.

Specification forming part of Letters Patent No. 161,672, dated April 6, 1875; application filed January 9, 1875.

*To all whom it may concern:*

Be it known that I, HENRY DUBBS, of Franklin, in the county of Venango and State of Pennsylvania, have invented certain new and useful Improvements in Compound for Decolorizing Petroleum and other oils, of which the following is a specification:

This invention relates to a new compound and process for decolorizing petroleum and hydrocarbon oils, and purifying and deodorizing the same.

It has heretofore been the practice in purifying and decolorizing such oils to filter them through animal charcoal, peat-charcoal, alumina, or substances containing alumina. These substances are all well-known decolorizing agents, and have been used for years for similar purposes, such as clarifying sugar and various other substances contaminated with organic coloring matter. When applied to the purification of petroleum and hydrocarbon oils, however, such decolorizing agents have been found only partially to answer the purpose.

My invention consists in a new compound for treating the oil, which is formed by taking the common unslaked lime of commerce and adding water to the same until completely slaked. An equal quantity of pine sawdust, by measure, is then added to the mass, and the whole thoroughly mixed, sufficient water being added to form a thick paste of the compound. The mass is then allowed to stand for twenty-four hours, or thereabout, until the sawdust is thoroughly saturated, after which it is placed in a shallow pan and subjected to a heat not exceeding 100° Fahrenheit until thoroughly dried. In this condition it is ready for use.

The petroleum or hydrocarbon oil to be treated is filtered through the above compound, which is placed in a suitable filter, steam-heat being applied to the mass during the operation of decolorizing and deodorizing the oil by means of a steam-jacket surrounding the filter in which the operation is carried on.

The following detailed description will enable those skilled in the art to fully understand the invention.

To prepare the compound, take of unslaked lime, twenty gallons; wood sawdust, twenty gallons. The lime is first completely slaked and thoroughly mixed with the sawdust, sufficient water being added to form a pasty mass. This is set aside for about twenty-four hours until the sawdust is thoroughly saturated, after which the compound is dried at a heat not exceeding 200° Fahrenheit. The lime being an active decolorizing agent, and being present in the innumerable pores of the wood, will be spread over an extended surface, and in intimate contact with the petroleum to be filtered, the compound thus forming a more perfect and effective bleaching and decolorizing agent than has hitherto been discovered.

For purifying and decolorizing the oil, the above-mentioned compound is taken and placed in a filter, of any convenient construction, surrounded by a steam-jacket. The oil is allowed to flow into the filter upon the compound, and percolates slowly through the mass, heat being applied through the medium of the steam-jacket during the operation. The oil will at first run clear and white, becoming gradually darker as the operation progresses until the compound ceases to act properly, when it must be removed and the charge renewed.

It will be found that forty parts, by volume, of the compounds will clarify and deodorize about forty parts of oil, removing the bitumen and grit entirely, and leaving the paraffine and valuable lubricating portions, giving lubricating oil of suitable color and gravity, and almost wholly free from objectionable odor.

The proportions of the ingredients composing the compound may be somewhat varied, according to the nature of the oil to be purified; and, therefore, I do not limit myself to the precise proportions above set forth.

Having thus described my invention, what I claim as new, and desire to secure by Letters Patent, is—

The improved compound for decolorizing petroleum or other oils, consisting of lime and sawdust combined, in the manner substantially as herein described, for the purpose specified.

In testimony that I claim the foregoing I have hereunto set my hand.

HENRY DUBBS.

Witnesses:
A. H. NORRIS,
J. TYLER POWELL.